Dec. 17, 1968   M. H. LARSON   3,416,751
SYSTEM FOR REMOTE CONTROL OF MISSILES

Filed May 19, 1967   7 Sheets-Sheet 1

INVENTOR
MELVIN H. LARSON
BY *Edward O. Ansell*
ATTORNEY
*C. E. Vautrain*, AGENT Dec. 17, 1968    M. H. LARSON    3,416,751
SYSTEM FOR REMOTE CONTROL OF MISSILES
Filed May 19, 1967    7 Sheets-Sheet 2

INVENTOR
MELVIN H. LARSON
BY Edward O. Ansell
ATTORNEY
C.E. Vanhusen Jr. AGENT

Dec. 17, 1968   M. H. LARSON   3,416,751
SYSTEM FOR REMOTE CONTROL OF MISSILES
Filed May 19, 1967   7 Sheets-Sheet 4

INVENTOR
MELVIN H. LARSON
BY Edward O. Ansell
ATTORNEY
C. E. Vautrain Jr., AGENT Dec. 17, 1968  M. H. LARSON  3,416,751
SYSTEM FOR REMOTE CONTROL OF MISSILES
Filed May 19, 1967  7 Sheets-Sheet 5

INVENTOR.
MELVIN H. LARSON
BY
J. Gordon Angus
ATTORNEYS.

INVENTOR.
MELVIN H. LARSON
ATTORNEYS.

United States Patent Office 3,416,751
Patented Dec. 17, 1968

3,416,751
SYSTEM FOR REMOTE CONTROL OF MISSILES
Melvin H. Larson, Bradbury, Calif., assignor to Aerojet-General Corporation, El Monte, Calif., a corporation of Ohio
Continuation-in-part of application Ser. No. 538,441, Feb. 28, 1966. This application May 19, 1967, Ser. No. 646,136
10 Claims. (Cl. 244—3.13)

ABSTRACT OF THE DISCLOSURE

This disclosure relates to remote control systems and particularly to line-of-sight missile control.

According to the present disclosure, a system is provided for controlling the direction of movement of a moving object along a prescribed path. A radiant energy beam having alternate adjacent portions of significantly different intensities is directed toward the moving object and the prescribed path. The beam is nutated about the path so that the alternate portions of the beam are swept across the object and path. Detectors are provided on the object for detecting the radiant beam. If the object is on the prescribed path, the detectors detect only the frequency of the beam portions swept across the object. If, however, the object is off the prescribed path, the detected signal is frequency-modulated by a signal at nutation frequency having a phase and amplitude dependent on the position of the object relative to the prescribed path. Means responsive to the modulation frequency is provided for relocating the object to the path.

---

This invention is a continuation-in-part of my co-pending application, Ser. No. 538,441, filed Feb. 28, 1966, for "System for Remote Control of Missiles" which is a continuation-in-part of my co-pending application, Ser. No. 271,958, filed Apr. 10, 1963, for "Method and Device for Remote Control of Missiles" both of which applications are now abandoned.

This invention relates to remote control devices and particularly to line-of-sight missile direction control.

In the field of object guidance and control it is desired and preferred to effect such guidance and control by means external to an object such as a missile thereby limiting as much as possible the amount of equipment borne by the object. Thus, if substantially all components of an intelligence system for determining object position error can be placed remote from the object, i.e., aboard a craft or at a land control station, substantial savings both in weight and space may be realized. Further, if such control may be accomplished without signal transmission from the object to the control station, then an additional advantage is realized, that of having an object control system which is substantially free of interference either intentional, such as jamming, or environmental.

The present invention provides a system for directing the flight of atmosphere or space traversing vehicles or objects in which no transmissions or reflections of energy are required from object to control station. The effective range of operation is determined by the distance between a pair of receivers positioned at the extreme rear portion of the object. Error signals generated within the object are fed to a control system which actuates corrective devices to return the object to a desired trajectory.

Accordingly, it is an object of the present invention to provide means for remote direction of an object whereby active error generating means are borne by the directing station and only passive reading means need be carried aboard the object.

It is another object of the present invention to provide means for remote object control in which line-of-sight direction is obtained through the use of frequency modulated energy in the infrared region of wavelengths.

It is a further object of this invention to provide a beam rider system for directing missiles or other objects to targets whereby error generating means are borne by the directing station and direction is effected without necessity for signal information to be transmitted from the object to the directing station.

Other objects and many of the attendant advantages of this invention will be readily appreciated as the same become better understood by reference to the following detailed description when considered in connection with the accompanying drawings, wherein.

In one embodiment of the invention, which may be described as a beam riding control system, object or missile control is obtained by projecting a pattern of radiant energy toward the target or area objective, the pattern of energy being sent toward and nutated about the center of the target. The source in the embodiment presently to be described is an infrared source which projects a position-coded beam pattern toward the target, the energy in various sectors of the source pattern being received by infrared receivers mounted in the tail of the missile which receivers are oriented toward the signal source. The infrared energy which is varying in intensity due to pattern motion is converted by the receivers to electrical signals which are in the form of frequency modulated (FM) carriers and are processed aboard the missile to yield guidance correction outputs. The guidance signals are in Cartesian coordinates which are referenced to missile roll position. Therefore, missile direction changes may be effected without information of missile roll orientation relative to the source position.

Figure 1:
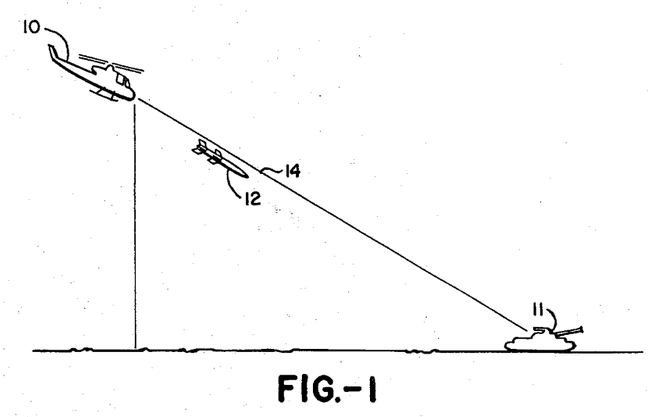
FIG. 1 illustrates one application of the invention.
Figure 2:
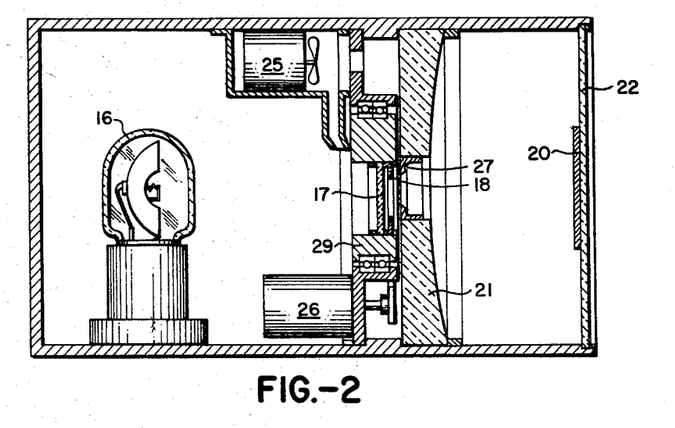
FIG. 2 is a side view, partly in cutaway section, of an error intelligence generating means of one embodiment of the invention.

Referring now to FIG. 1, the source of the infrared position-coded pattern is carried aboard helicopter 10 and the pattern is directed toward the target, is this case tank 11. Missile 12, having been launched from helicopter 10, is then directed down the line of sight 14 to target 11. The equipment for generating the position coded pattern aboard helicopter 10 is indicated in FIG. 2 wherein a projector lamp 16 is shown which projects infrared radiation toward spectral filter 17 and through the spectral filter and reticle 18 toward reflecting surface 20 from which it is reflected to primary mirror 21 and thereafter through window 22 toward taget 11. Reticle 18 is illustrated in one form in FIG. 6. Fan motor 25, reticle drive motor 26, field stop 27 and nutating mechanism 29 complete the components of this embodiment of information source. Reticle 18 may be segmented in a variety of patterns, that shown in FIG. 6 merely being an exemplary embodiment.

Reticle 18, when nutated, produces a generally circular sweep about the taget center, an important point to realize here being that the reticle itself does not rotate and thus its coordinates do not change alignment with respect to the target during operation of the system. The effect of reticle nutation is to cause apparent motion of a missile between the source and the target about a circle 30 indicated in FIG. 6 when the missile is out of line with the line of sight between the source and the target. The line of sight may also be considered the axis of a cone about which the reticle pattern is nutated.

Figure 8:
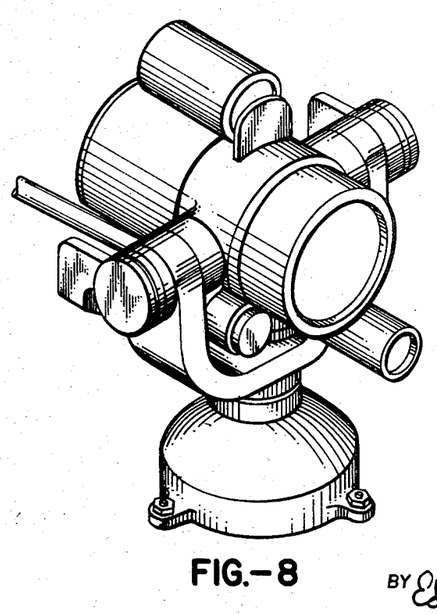
FIG. 8 is an isometric view of means for aiming one embodiment of error generating pattern.

To nutate the reticle, the entire reticle is moved in a rotary path displaced from the center of the reticle. The reticle is not rotated about its own axis, but rather is moved about the prescribed line-of-sight path so that the coordinates of the reticle do not change alignment. (The nutation movement is analogous to the movement of a sponge when washing a window.) For each cycle of nutation, the missile will appear to cross many segments of the radiated pattern from the reticle, and the IR signal received by the missile has a carrier frequency dependent on the number of segments of radiated IR that pass across the missile.

Where the source of infrared nutating radiation is carried aboard a craft susceptible to motion about the three axes of movement, gimbaled means such as those shown in FIG. 8 may be employed to assist in maintaining the axis of nutation constantly aimed at the center of the target.

Figure 3:
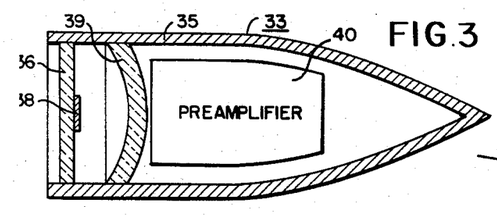
FIG. 3 is a side view, partly in cutaway section, of an error reading means of one embodiment of the invention.
Figure 3A:
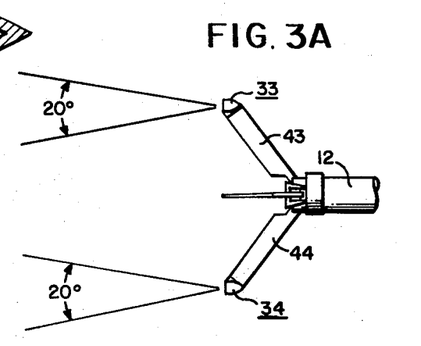
FIG. 3a is a side view of a portion of a missile having error reading means attached thereto.

FIG. 3 illustrates the receiving means carried on the missile for intercepting and converting the infrared radiation information transmitted from the source into electrical signals. The receiving means includes two identical units 33 and 34, each having a protective outer shell 35, a protective window 36 which is maintained directed toward the source, a detector 38 mounted on the inner surface of window 36, a reflector 39, and a preamplifier 40. Receiving units 33 and 34 are carried at the extremities of fins 43 and 44 which, in the embodiment described, are folded along the longitudinal axis of the missile on launching and are moved to their extended position shortly after missile 12 has cleared its launching tube or other launching mechanism. The receiving units are shown as having 20° sectors or cones within which radiation from the information source may be received. It is submitted, however, that the cone angle may be considerably less, for example, where it is desired to decrease the possibility of interference signals being intercepted by the detectors, or greater where such requirement is not present.

Figure 4:
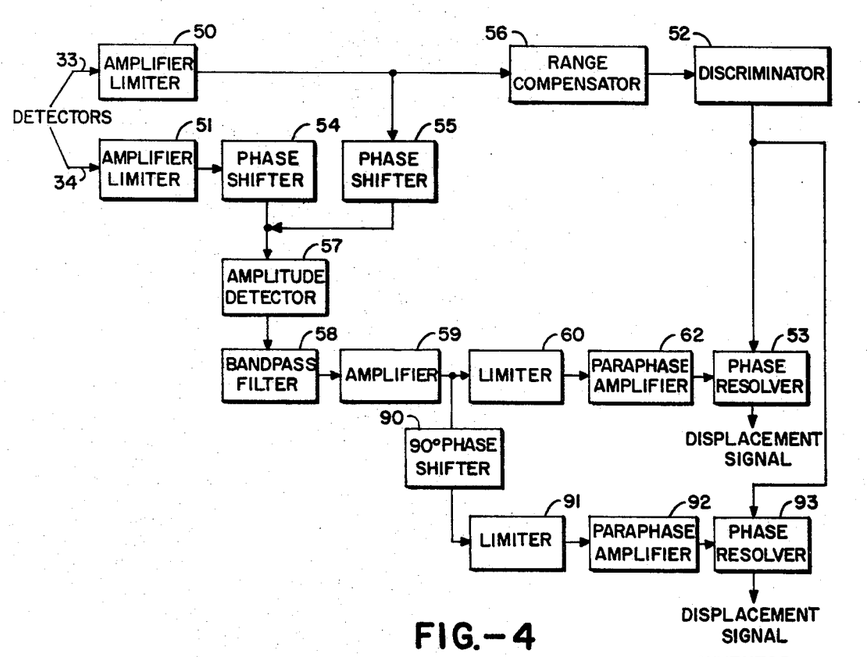
FIG. 4 is a block diagram of the operative components of one embodiment of the invention.

The block diagram shown in FIG. 4 illustrates one form of apparatus to translate the information received by the infrared detectors on missile 12 into signals which represent missile position relative to the line-of-sight. The missile electronics, therefore, accepts signals from the two receivers and processes them to yield actuating signals for the control system. Analog voltages are developed which indicate the position of the missile relative to the line-of-sight in Cartesian coordinates as referred to the roll position of the missile. The error signals derived pass through a lead compensation network, devised to stabilize the entire servo control loop, and then to missile positional control system. The signal from each detector is preferably amplified first at or near the position of detection, that is, in the unit receivers 33 and 34, and then by amplifier limiters 50 and 51 after which the signal from one detector, namely 33, is fed through range compensator 56, is demodulated by discriminator 52 and fed to phase resolver 53. This signal is an alternating voltage at a frequency corresponding to the frequency of nutation of the IR beam pattern. Signals from detectors 33 and 34 are shifted in phase by phase shifters 55 and 54, respectively, in such a manner that a fixed phase shift of 90° exists between them. These signals are then added and the resultant signal is fed into amplitude detector 57 from which the information passes through bandpass filter 58, amplifier 59, limiter 60, and paraphase amplifier 62.

This signal is also an alternating voltage at a frequency corresponding to the frequency of nutation of the IR beam pattern.

Figure 7:
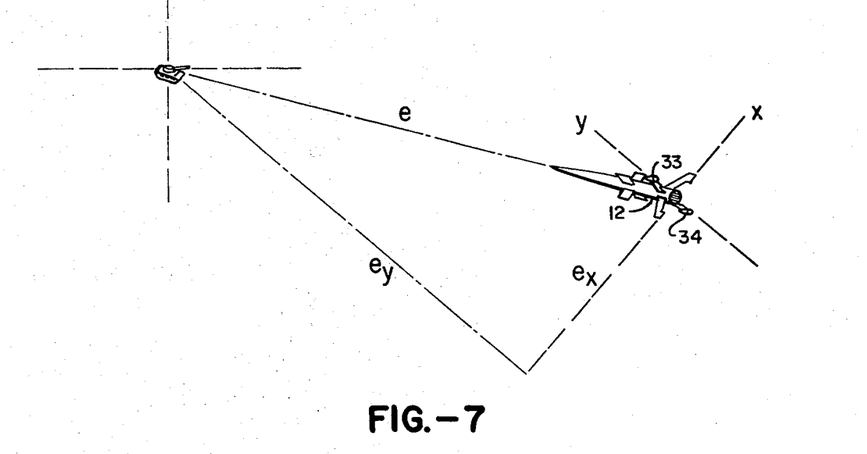
FIG. 7 is a representation of the principle of operation of one embodiment of the invention.

Phase resolver 53 generates a DC signal which is proportional to the cosine of the phase angle between signals from discriminator 52 and the paraphase amplifier 62. This signal represents missile displacement $e_x$ as shown in FIG. 7. The signal from the amplifier 59 is also fed to phase shifter 90 and thence passes through limiter 91, paraphase amplifier 92 and phase resolver 93 to generate a second displacement signal representing $e_y$ in FIG. 7. These displacement signals are fed to the properly oriented missile positional control system to effect corrective action on the missile and return it to the line-of-sight path. That is, $e_x$ controls correction in one plane and $e_y$ controls correction in the orthogonal plane.

The frequency modulated processing previously described provides polar error signals which are proportional to the angle of the missile off the cone axis, as viewed from the source of radiation. For proper guidance, error signals are required which are proportional to the physical displacement of the missile with respect to the sight line 14 of the source. The relationship between these parameters is a function of the range between the source and the missile. Since the range is predictable for any given time after the missile firing, it is possible to vary the gain in the error signal path as a function of time and thus adjust for the varying range. This may be accomplished in the range compensator 56 by varying the position of a potentiometer with a small timer, starting at the time of firing or launching of the missile. The gain may thus be increased in proportion to range until it reaches a maximum at the greatest effective range of the missile.

Figures 5, 6:
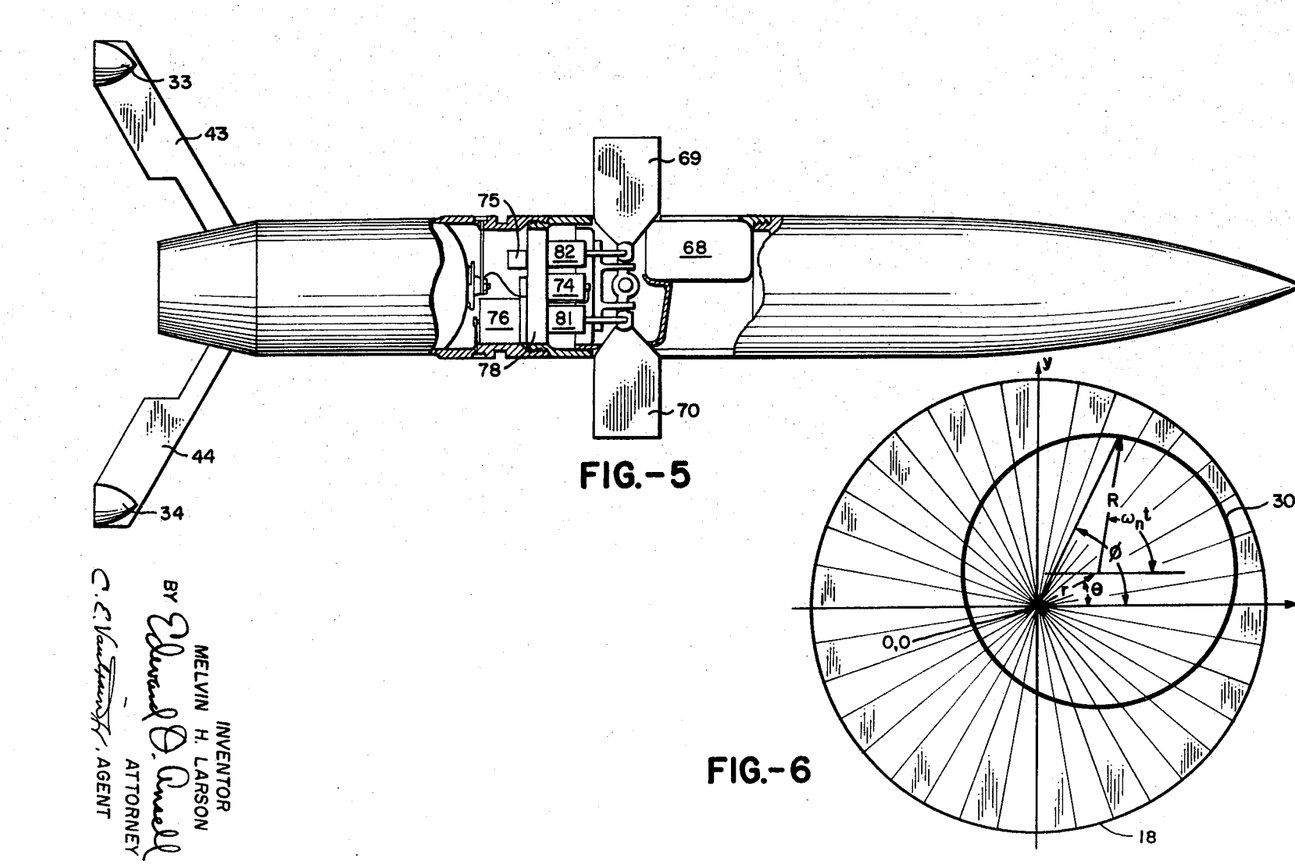
FIG. 5 is a partly cutaway side view of a missile to be used with one embodiment of the invention.
FIG. 6 is a schematic diagram of one embodiment of an error generating pattern.

FIG. 5 shows a cross-section of a missile adapted to be controlled in flight through operation of this invention. The missile includes an electronics guidance package 68, wings 69 and 70, fins 43 and 44, gas generator 74, turbine alternator 76, hot gas manifold 78, and pistons 81 and 82. A second set of fins, wings and pistons, not shown, is positioned at right angles to the ones shown. Only one set of fins is provided with detectors.

The nutating FM reticle pattern shown in FIG. 6 is produced from the source shown in FIG. 2 and provides alternate areas of greater infrared radiation and less infrared radiation, the areas of greater infrared radiations being detected by receiver units 33 and 34, with the time of exposure to each area of greater radiation providing a pulse of information, a train of which indicates the position of the missile with respect of the line-of-sight target.

Error processing is accomplished with reference to the coordinate system of FIG. 6, which coordinate system is considered fixed to the reticle, and object space is considered projected onto the reticle. The boresight axis of the system is (0, 0). Due to the nutation, a detector on the boresight axis in object space will appear to rotate around the reticle at a radius R and an angular frequency $\omega_n$. A detector which is off the boresight axis will appear to rotate on the reticle in a circle of radius R, but with a center at $(r, \theta)$, where the coordinates $(r, \theta)$ represent the distance and direction by which the detector is off the boresight axis. Furthermore, the coordinates $(r, \theta)$ are the desired error quantities to be obtained from the error processing.

Although in truth the projected infrared beam pattern is not "rotated" in the normal sense of the word, for convenience in describing the appearance of rotation of a detector about the reticle resulting from nutation of the pattern, the expression "rotating beam" will be used.

While $r$ and $\theta$ define the detector position, it is necessary to obtain this position in Cartesian coordinates and it is desirable to reference this coordinate system to the missile roll position. This is accomplished by providing a signal which represents the phase angle of the rotation with respect to the missile roll position. This phase angle is obtained by using detectors 33 and 34 on the missile or other object, which detectors are separated in space in a plane normal to the line-of-sight, and by appropriate processing of two signals generated by these detectors. Since the linear portion of the reticle is constructed on a radial pattern, the signal output of the detector depends only on the angle $\phi$. While the detector output appears to be a square wave, defocusing and electronic filtering eliminate all significant harmonics in a practical system. The basic signal then, is a wave given by Equation 1:

$$e_0 = K \sin [n\phi] \quad (1)$$

where $$\phi = \tan^{-1} \frac{r \sin \theta + R \sin \omega_n t}{r \cos \theta + R \cos \omega_n t} \quad (2)$$

K is a constant having to do with the conversion of electromagnetic energy to an electrical siganl, and $n$ is the number of energy areas in the reticle.

The frequency of the sine term of Equation 1 is:

$$\omega = n\omega_n \left[ \frac{1 + \frac{r}{R} \cos (\omega_n t - \theta)}{1 + \frac{r^2}{R^2} + 2\frac{r}{R} \cos (\omega_n t - \theta)} \right] \quad (3)$$

Equation 3 may be written in the form:

$$\omega = n\omega_n \left[ 1 - \frac{r}{R} \cos (\omega_n t - \theta) + \frac{r^2}{R^2} \cos 2(\omega_n t - \theta) - \frac{r^3}{R^3} \cos 3(\omega_n t - \theta) + \ldots + \left(-\frac{r}{R}\right)^m \cos m(\omega_n t - \theta) + \ldots \right] \quad (4)$$

Equation 4 thus gives the frequency of the sine wave of Equation 1. Integrating Equation 4 with respect to time and eliminating terms which are insignificant due to physical limitations of the reticle pattern it may be shown that:

$$e_0 = K \sin \left[ n\omega_n t - n\frac{r}{R} \sin (\omega_n t - \theta) \right] \quad (5)$$

Equation 5 thus represents a frequency modulation carrier, with amplitude $r$ and phase $\theta$ of the modulation readily obtainable by standard frequency demodulation technique, $e_0$ thus represents the displacement of the missile from the line-of-sight. In order to obtain the missile roll position in space, two detectors 33 and 34 are used having coordinates $(r_1\theta_1)$ and $(r_2\theta_2)$, with corresponding signals $e_1$, $e_2$, respectively.

Equations 6 and 7 below represent the displacement of detectors 33 and 34, respectively, from the line-of-sight.

$$e_1 = K \sin \left[ n\omega_n t - n\frac{r_1}{R} \sin (\omega_n t - \theta_1) \right] \quad (6)$$

$$e_2 = K \sin \left[ n\omega_n t - n\frac{r_2}{R} \sin (\omega_n t - \theta_2) \right] \quad (7)$$

Assuming that $e_1$ is electrically shifted in phase by an angle and that $e_2$ is shifted—intentionally by the electric processing of this system as will be explained in the following, thus $$e_1 \angle \alpha = K \sin \left[ n\omega_n t = n\frac{r_1}{R} \sin (\omega_n t - \theta_1) + \alpha \right] \quad (8)$$

$$e_2 \angle -\alpha = K \sin \left[ n\omega_n t - n\frac{r_2}{R} \sin (\omega_n t - \theta_2) - \alpha \right] \quad (9)$$

Subtracting Equation 9 from Equation 8 and applying a trigonemetric identity:

$$e_1 \angle \alpha - e_2 \angle -\alpha =$$
$$2K \sin \left[ n\frac{r_2}{2R} \sin (\omega_n t - \theta_2) - n\frac{r_1}{2R} \sin (\omega_n t - \theta_1) + \alpha \right] \cdot$$
$$\cos \left[ n\omega_n t - n\frac{r_1}{2R} \sin (\omega_n t - \theta_1) - n\frac{r_2}{2R} \sin (\omega_n t - \theta_2) \right] \quad (10)$$

If demodulation is used it may be shown that the detected amplitude is represented by:

$$|e_1 \angle \alpha - e_2 \angle -\alpha | =$$
$$\sin \left[ \frac{n}{2R} r_2 (\sin \omega_n t \cos \theta_2 - \cos \omega_n t \sin \theta_2) - r_1 (\sin \omega_n t \cos \theta_1 - \cos \omega_n t \sin \theta_1) \} + \alpha \right] \quad (11)$$

Since from FIG. 6 it may be noted that the Cartesian coordinates of the two detectors are $X_1 = r_1 \cos \theta_1$; $Y_1 = r_1 \sin \theta_1$; $X_2 = r_2 \cos \theta_2$ and $Y_2 = r_2 \sin \theta_2$. Substituting these values in Equation 11, that equation may now be written:

$$|e_1 \angle \alpha - e_2 \angle -\alpha| = \sin \left[ \frac{n}{2R} \{ (X_2 - X_1)^2 + (Y_2 - Y_1)^2 \}^{1/2} \sin (\omega_n t - \tan^{-1} \frac{Y_2 - Y_1}{X_2 - X_1} + \alpha \right] \quad (12)$$

In order to avoid losing information because the amplitube detector cannot resolve the difference between negative and positive modulation it is necessary that $$\frac{n}{2R}[(X_2 - X_1)^2 + (Y_2 - Y_1)^2]^{1/2} > \alpha \quad (13)$$

The quantity $$[(X_2 - X_1)^2 + (Y_2 - Y_1)^2]^{1/2}$$

is the distance between detectors, and tan $$^{-1}\left(\frac{Y_2 - Y_1}{X_2 - X_1}\right)$$

is the angle between the line joining the detectors and the X-axis. Denoting these quantities, respectively, by $a$ and $\gamma$, Equation 12 and inequality 13 may be rewritten as:

$$|e^1 \angle \alpha - e_2 \angle -\alpha| = \sin \left[ \frac{n}{2R} a \sin (\omega_n t - \gamma) + \alpha \right] \quad (14)$$

Equation 14 illustrates the reason for the phase shifts in $e_1$ and $e_2$. Such shifts are necessary to prevent the balanced demodulation condition described above. It may be shown that Equation 14 contains the missile roll coordinates.

The operation of the error generating control system of the present invention has been described in part in the foregoing but will be amplified in the following portion of the application. The system is a variation of the FM homing tracker method which has been demonstrated to have a very high angular accuracy, to have a good rejection factor for extraneous IR background signals and ability to operate over a wide range of input signal. The radiant energy projected into space is in the form of a pattern, as previously described, which pattern is caused to nutate or rotate in such a manner that alternate areas of greater radiation and less radiation are swept across receivers on the missile. The resultant electrical signal generated in the receivers is an FM signal whose deviation is a function of missile position in the pattern.

When a receiver is centered in the axis of the cone of nutation, no deviation of the carrier frequency occurs. However, as the receiver moves away from the cone axis frequently modulation occurs. By using a discriminator aboard a missile, such frequency modulation is recovered as an alternating voltage, its amplitude being proportional to the distance from the center of the axis while its phase relative to the nutated energy pattern position is a function of the direction from boresight which also is the cone axis or line-of-sight. The signal is in effect a polar representation of position or, in other words, polar error.

The present system to this point operates on the basic principle of operation disclosed in a co-pending application of Sidney C. Argyle, for "Compact Optical Tracking System," Ser. No. 91,544, filed Feb. 24, 1961, and now Patent No. 3,296,443, issued Jan. 3, 1967 and assigned to the same assignee as is the present application.

The present invention operates on different principles from this point by the use of a second receiver on the missile which is displaced from the first along a line normal to the missile line of flight. The addition of the second receiver, an amplifier limiter, and a phase-difference detector allows a reference signal to be generated which can be used to resolve the polar error signal directly into missile coordinates. This eliminates the necessity of a roll gyro and a roll resolver, or roll control system. The base missile guidance package thus consists of a pair of simple IR receivers, a small electronics package and a control system. The only mechanical devices on the missile are the control elements. This results in substantial reduction in weight, space and cost as well as increased reliability. The missile electronics thus accepts signals from the two receivers and processes them to yield actuating signals for the control system.

The first step in the process is to develop analog voltages which indicate the position of the missile relative to the desired boresight or cone axis. These error voltages are resolved in Cartesian coordinates which are referred to the roll position of the missile. To accomplish this, two AC signals are generated at approximately the nutation frequency of the reticle source. The first signal is the polar error signal and is generated as described in the foregoing portions of the application, that is, the FM carrier signal from a single receiver on the missile is amplified, limited, and then discriminated to yield an AC signal whose amplitude is proportional to angular distance from the cone axis, and whose phase relative to the position of the nutating reticle indicates angular position around cone axis. The second AC signal is generated utilizing outputs of both missile receivers. The carrier signal from each receiver will have a slightly different deviation pattern. It is this difference which forms the basis for deriving the missile reference signal. The two signals are processed in a circuit, the output signal of which is a function of the instantaneous phase difference between the two carrier signals. This output signal is related to the mechanical position of the nutating reticle in that it is the nutation frequency plus the roll frequency of the missile. Mathematically it can be expressed as $E_r = \sin(\omega_n t + \theta_r)$ where $E_r$ is the missile reference signal, $\omega_n$ is the nutation rate and $\theta_r$ is the total roll angle of the missile from the launch position.

This reference signal is then used in a phase resolver to derive a DC voltage which is proportional to the in-phase component of the polar error signal. It is also shifted 90°, and in like manner a second phase resolver yields the $j$ component of the error signal. In the missile itself, these error signals pass through a lead-compensation network selected to stabilize the entire servo loop and thus to the control system.

Figure 9:
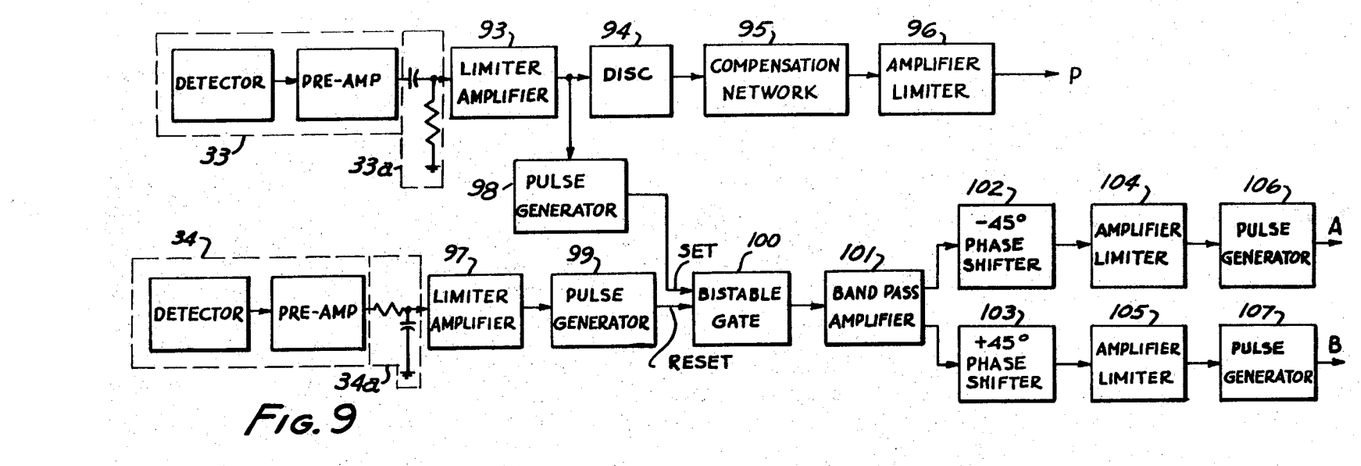
FIG. 9 is a schematic and block diagram of an alternate form of processing system of the invention.
Figure 10:
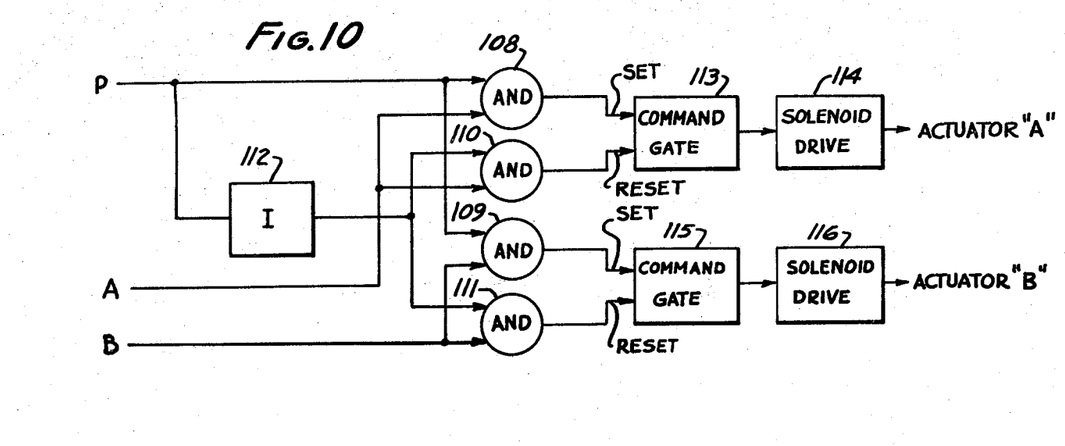
FIG. 10 illustrates a gating circuit for interconnecting the processing system of FIG. 9 to missile control actuators.

Alternative apparatus for processing of the infrared signals generated by the detectors 33 and 34 is shown in the schematic block diagram form in FIGS. 9 and 10. The signal developed by detector 33 comprises the carrier frequency (dependent on the number of segments of radiated IR in the reticle), frequency-modulated by the nutation signal, as hereinbefore explained. The amplitude and phase of the nutation signal is representative of the relative position of the detector in space as hereinbefore explained. With reference particularly to FIG. 9 and to FIGS. 11a–11g, 12a and 12b, the signals from detector 33 are amplified by the pre-amplifier (Pre-Amp) and are shifted in phase by phase shifter 33a. Phase shifter 33a is tuned to shift the phase of the signal from detector 33 forward 45° when the received signal is at carrier frequency. At frequencies above the carrier frequency, due to the modulating nutation frequency, phase shifter 33a shifts the signal frequency by more than +45°, while at frequencies below the carrier frequency the shift is somewhat less than +45°. The purpose of phase shifter 33a will be more fully explained hereinafter.

Figure 11A:
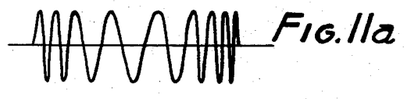
FIGS. 11a–11h are representations of waveforms associated with the diagram of FIG. 9.
Figure 11B:
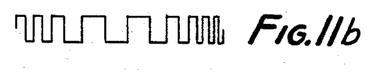

The signal developed by detector 33 is represented in FIG. 11a and is applied through phase shifter 33a to limiter amplifier 93 to obtain a square-wave alternating signal, represented in FIG. 11b. The signal from limiter amplifier 93 is applied to discriminator circuit 94 (Disc) which separates the modulating nutation signal from the received signal and provides a signal at the nutation signal frequency having a phase and amplitude dependent on the position of the missile. This signal from discriminator circuit 94 (represented in FIG. 11c) is applied to compensation network 95.

Figure 11C:
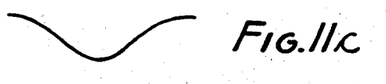
Figure 12A:
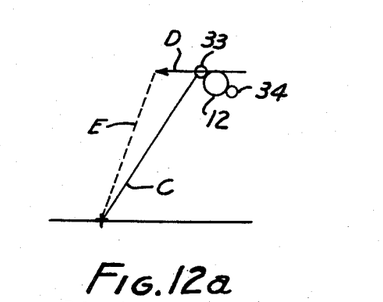
FIG. 12a is a vector diagram illustrating the operation of a portion of the diagram of FIG. 9.

Referring particularly to FIG. 12a, missile 12 is schematically represented as having detectors 33 and 34. Line C represents the vector distance and direction between the coordinant center of the IR beam to detector 33. As hereinbefore explained, the nutation signal illustrated in FIG. 11c has an amplitude representative of the distance from the coordinant center to detector 33 and has a phase representative of the angular position from a reference coordinant of the coordinant system. Thus, the phase and amplitude of the nutation signal is representative of the position of the missile with respect to the center of the beam. The compensation network 95 modifies the nutation signal in such a manner as to provide lead compensation for the missile to prevent excess "hunting" of the missile about the infrared beam.

In operation, compensation network 95 derives a signal dependent upon the first derivative of the nutation signal shown in FIG. 11c with respect to time. More accurately, the derived signal is representative of the partial derivative of both the phase and the amplitude of the nutation signal $$\frac{\alpha E + \phi}{\alpha t}$$

This signal derived by compensation network 95 is illustrated in vector diagram 12a as signal D. Signals C and D, that is, the nutation signal and its first derivative are added together by compensation network 95 to derive resultant signal E. Vector D, being the first derivative of position with respect to time, is representative of the anticipated next position of the missile with respect to the coordinant center. The vector addition of signals C and D result in compensation signal E which will have a phase and amplitude operable to compensate the missile at its next position. This prevents excessive hunting of the missile about the infrared beam and eliminates overcompensation of the missile position. Thus, the compensation signal E will be at the nutation frequency, but will be shifted in phase and amplitude from the received nutation signal. Amplifier limiter 96 limits signal E to provide a square-wave alternating signal P at nutation frequency that is at a proper level for compatability with the remainder of the apparatus.

The roll of the missile can be detected by the relative positions of detectors 33 and 34. The signals generated by detector 34 are acted upon by phase shifter 34a which shifts the signal −45° at carrier frequency. At signals above carrier frequency the shift is greater than −45°, while at frequencies below the carrier frequency the shift is less than −45°. Thus, for any given frequency, phase shifters 33a and 34a cooperate to shift the received signals at 33 and 34 by 90°, so that the signal delivered to amplifier limiter 93 is shifted to lead the signal delivered to amplifier limiter 97 by 90° at all frequencies. Amplifier limiter 97 transforms the signal to a square-wave alternating signal. The roll position of the missile is detected by differences in frequency and phase brought about by the different relative physical locations of detectors 33 and 34 in the infrared beam. This is more fully explained by reference to FIGS. 11d–11g and FIG. 12b.

Figure 11D:
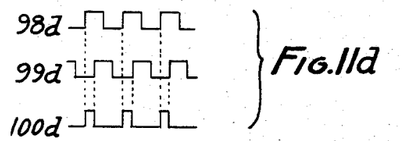
Figure 11E:
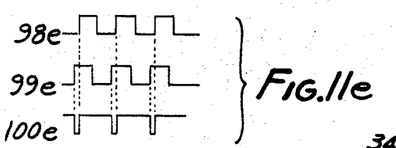
Figure 11F:
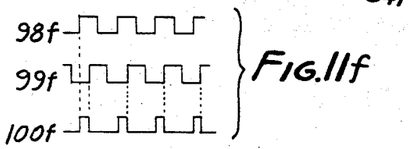
Figure 11G:
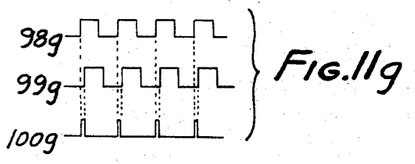
Figure 12B:
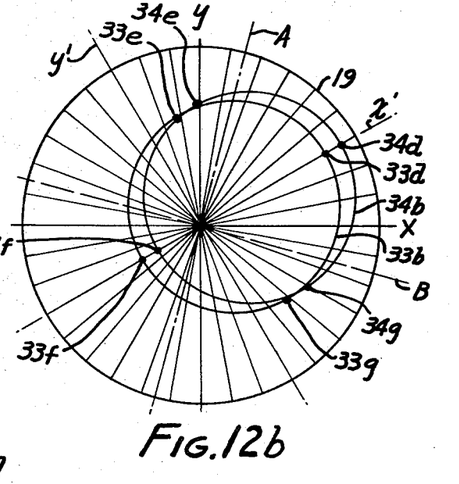
FIG. 12b is a representation of the principle of operation of the embodiment illustrated in FIGS. 9 and 10.

With reference particularly to FIGS. 12b and 11d–11g, the generation of signals by pulse generators 98 and 99 are illustrated for four positions of the missile in the nutating IR beam. In FIG. 12b, there are illustrated two circular paths displaced from the center of the coordinant system about which each missile detector will follow for any given error of the missile. Detector 33 is in circular path 33b, while detector 34 is in circular path 34b.

In a first position of the missile, the detectors are momentarily at positions 33d and 34d. Thus, the signals generated by detectors 33 and 34 in the nutating IR beam are in phase. These signals, however, are shifted 90° relative to each other due to phase shifters 33a and 34a, and the signals generated by pulse generator 98 and 99 are exactly 90° out of phase. For each pulse from pulse generator 98, bi-stable gate 100 is switched to a "set" position, while for each pulse from pulse generator 99 the bi-stable gate 100 is "reset." Since the signal from pulse generator 98 is leading the signal from pulse generator 99 by 90° due to the phase shift, the pulse output from bi-stable gate 100 has a duration of 90°. This is illustrated in FIG. 11d.

Assuming that the nutation of the reticle moves to a position such that the detectors are in positions 33e and 34e, respectively, and that the missile has not rolled, detector 33 is leading detector 34. Since the signals from detector 34 are shifted back 90° relative to the signals from detector 33, the relationship of the pulses from pulse generators 98 and 99 is such that the pulses from pulse generator 99 slightly leads the pulses from pulse generator 98. Thus, when the detectors are at positions 33e and 34e, the signals produced by pulse generator 100 are of longer duration than when the missile was at the first position. This is illustrated in FIG. 11e. Likewise, when the missile position is such that the detectors are at 33f and 34f, the relationship between the pulses from pulse generators 98 and 99 is about 90° out of phase due to the phase shifting networks 33a and 34a, and the resultant pulse output from bi-stable gate 100 is similar to the pulse output when the missile it at position D. This is illustrated in FIG. 11f. Finally, when the missile position is such that the detectors are at 33g and 34g, detectors 34 is leading detector 33. The relationship of the signals is shifted back 90° due to the phase shifting networks 33a and 34a, so that the pulses from pulse generator 98 are slightly leading the pulses from pulse generator 99. Thus, when the detectors are at 33g and 34g, the pulses from bi-stable gate 100 are of shorter duration than when the missile is at the other positions. This is illustrated in FIG. 11g.

The discussions thus far has assumed that the missile has not been rolling. The signals produced by bi-stable gate 100 when the missile is not rolling comprises a carrier frequency of pulses dependent upon the reticle pattern crossed, frequency-modulated at the nutation frequency. This is true because the modulating frequency has gone through exactly one full cycle for each cycle of nutation of the IR beam when the missile is not rolling, all the radiated segments of the reticle pattern having crossed the detectors. However, if the missile is rolling, the frequency of modulation of the signals produced by bi-stable gate 100 is altered due to the changing relative positions of detectors 33 and 34 during each nutation cycle. Thus, the modulation frequency is altered from the nutation frequency to be either higher or lower (depending on the direction of the roll), and the amount of frequency shift of the modulation frequency is indicative of the rate of roll of the missile.

Bandpass amplifier 101 passes the modulation signal and produces a resultant signal having a frequency indicative of the missile roll. This signal is shown as "R" in FIG. 11h, and has a high amplitude when the pulses from gate 100 have their longest duration (when the missile is at position e in FIG. 12b), and has a low amplitude when the pulses from gate 100 have their shortest duration (when the missile is at position g in FIG. 12b). Zero crossings occur at positions d and f. Amplifier 101 also improves the signal-to-noise ratio.

The signal output from the bandpass amplifier is divided into two signals, shifted in phase by 90° from each other by phase shifter 102 and 103. As brought out in earlier description, it is necessary to provide the 90° phase shift since the missile-controlling apparatus includes two sets of controls disposed 90° to one another. Amplifier limiters 104 and 105 and pulse generators 106 and 107 operate to form pulse signals A and B. The pulse frequencies of signals A and B will be at the same frequency as the modulation frequency produced by bi-stable gate 100, and thus shifted from the nutation frequency by an amount dependent on the missile roll gate.

Referring to FIG. 10 and utilization of the signals P, A and B generated by the circuit of FIG. 9, assume P to be positive. This means that one positive input is accordingly made to each of the AND gates 108 and 109, and one negative input to each AND gate 110 and 111 via an inverter (I) 112. The gates 108–110 are of such construction that a pair of coincident positive signals are needed at the input to provide an output signal. If a positive A signal is coincident with the positive P, then a SET signal is applied to the command gate 113 and the solenoid drive 114 powers the actuator "A" to effect manipulation of one of the sets of missile controls in a positive direction along the A axis. Similarly, if a positive signal B is coincident with a positive P, a SET signal is made available by AND gate 109 to command gate 115 and thereby solenoid drive 116 is energized to impel actuator "B," driving the other of the sets of missile controls in a positive direction.

At those times when P is negative, the output of gates 108 and 109 are down, regardless of the presence or absence of A and B signals. However, at this time the negative P signals are converted to positive signals and presented to the AND gates 110 and 111. As a result, coincident positive A signals actuate gate 110, resetting command gate 113, de-energizing solenoid drive 114 and driving actuator "A" to provide missile control in a reverse direction. In a similar manner, when positve B signals are coincident with negative P signals, the gate 111 provides resetting of the command gate 115, de-energizing solenoid drive 116, and the actuator "B" provides negative direction control to the other of the sets of control apparatus.

The operation of the embodiment illustrated in FIGS. 9 and 10 can best be explained with reference to FIGS. 11h, 12b, 13a and 13b. As previously explained, the resultant signal R is derived from the output from bi-stable gate 100. If the missile is not rolling (as will be initially assumed in this explanation) signal R is at the same frequency as signal P, that is, at nutation frequency.

Referring to FIG. 12b, the rectile pattern is shown having its center at the crossing of the x and y coordinates of the reticle pattern. The missile is shown displaced from the center crossing of the reticle coordinates in the +x, +y quadrant of the reticle pattern. For purposes of illustration, a second coordinate system x', y', has the same center as coordinate system x, y but is situated such that the x' axis passes through both detectors 33 and 34. A further set of axes A, B are shown displaced from the x' and y' axes by 45°. The x', y' axes represent the position of the detectors. The A, B axes represent the positions of the missile controls (since they are usually displaced 45° from the detectors as hereinbefore explained) and the x, y axes represent the position of the reticle pattern.

Figure 11H:
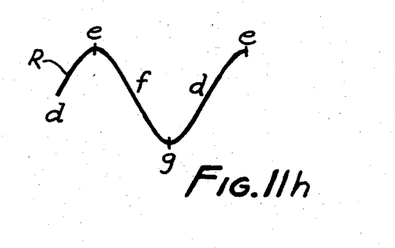
Figure 13A:
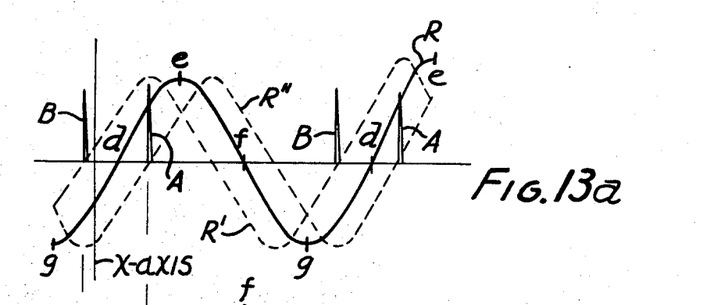
FIGS. 13a–13c are representations of waveforms associated with the embodiment illustrated in FIGS. 9 and 10.

As previously explained, resultant signal R from the bandpass amplifier 101 has a waveform illustrated in FIG. 11h. The positive-going, zero crossing of signal R occurs when the missile is in position d. As illustrated in FIG. 12b, position d is displaced from the x axis of the reticle pattern by about 30°. Thus, signal R may be related (for purposes of explanation) to the x axis of the reticle pattern. As shown in FIG. 13a, signal R is displaced from the x axis by about 30° (in this example). Phase shifters 102 and 103 shift signal R −45° and +45°, respectively, to derive signals R' and R" respectively, shifted 90° from each other. Pulse generators 106 and 107 produce short pulses at the positive-going zero crossings of signals R' and R" to produce pulses A and B, respectively.

Figure 13B:
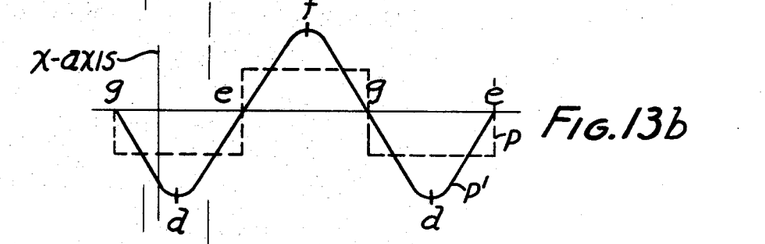

Referring to FIGS. 12b and 13b, signal P can be related to the x axis of the reticle pattern. Signal P', which is the signal from compensation network 95 (which, if the missile is slowly maneuvering, may be presently considered as the same as the signal from discriminator 94), has its positive peak when the missile is at position f, its negative peak when the missile is at position d, and its zero crossings when the missile is at positions e and g. This is due to the fact that detectors 33 senses a higher frequency of reticle bars at position f than at position d. Pulse signal P is thus derived from signal P' and is shown in FIG. 13b physically related to the x axis of the reticle pattern.

Figure 13C:
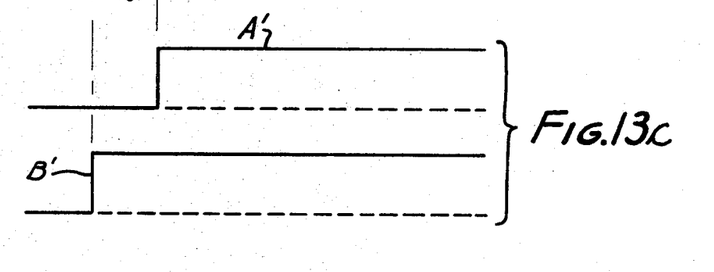

When the missile is at the position shown in FIG. 12b, the A and B pulses both occur during the negative half-cycle of the P pulse. The first B pulse cooperates with the P pulse to trip AND gate 111 in FIG. 10 so that command gate 115 is reset, thereby allowing actuator B to drive the missile in a negative direction along the B axis in FIG. 12b. The B actuator remains on (as illustrated by the B' signal in FIG. 13c) until the missile is moved back across the A axis into the negative B region. At this point, it can be shown that the phasing between signals P and R changes so that the B pulses occur during positive P pulses to drive the missile back again. Likewise, the first A pulse cooperates with the negative P pulse to trip AND gate 110 so that command gate 113 is reset to drive actuator A in the negative direction. The A actuator remains on until the missile crosses into the negative A region.

Eventually, the missile will be maneuvered back to a position on the beam path. As heretofore explained, signal P does not generate when the missile is on the beam path because the nutation frequency is not detected by the detectors when the missile is on beam frequency. Since the AND gates in FIG. 10 must make a decision to maneuver the missile in either a positive or negative direction along the A and B axes, the missile is in an unstable position. The missile control system will go into a limit cycle spending short but equal time periods on each side of the beam center.

Heretofore, the discussion has assumed that the missile has not been rolling. However, if the missile is rolling, for example counter-clockwise, the signal generated by detector 34 will be shifted forward from the signal generated by detector 33 so that the resultant signal R is shifted forward from the position shown in FIG. 13a. If shifted far enough forward, the B pulse, which leads signal R by 45°, will coincide with the positive portion of the P pulse so that the B actuator is driven forward while the A actuator is driven negative.

Although only one position of the missile has been examined in detail, it can be shown that the system will correctly maneuver the missile back to beam center no matter where the missile is in the reticle pattern or in what roll position the missile is in.

The infrared-directed system of the present invention is particularly invulnerable to counter measures. The only elements in the system subject to jamming are the receivers on the missile, and since they have a restricted field of view which looks away from the target during the entire missile flight, it would be very difficult if not impossible to interfere with the guidance system.

In summary, there have been presented two embodiments of a control system for controlling the flight of missiles or objects which embodiments may be used against fixed or slow speed targets. Guidance consists of a stabilized infrared pattern source aimed by a control operator at a non-stabilized station, a pair of infrared receivers mounted in the tail of the missile or object, a missile electronic signal processing or error-reading unit, and a missile wing control unit. The infrared source aboard the control station emits a position-coded IR beam which is received on the missile and processed in the electronics unit to yield correctional signals to the missile wing control system. Thus, the missile is always being directed toward the center of the beam. The dual receiver installation is a simple method of converting correction signals directly into missile coordinates, thus eliminating the need for a roll gyro and its associated complexity.

Processing the signals on board the missile eliminates the need to track the missile from the aircraft in either the line-of-sight or the roll position. Thus, the aircraft installation is greatly simplified by eliminating the IR tracking associated with a conventional command guidance scheme, and the missile is simplified by eliminating the missile IR flare and roll gyro and associated elements. The guidance receivers and processing unit for a missile provide a signal proportional to missile displacement from the center of the beam.

The guidance, control and aerodynamic response of the missile embodiment disclosed herein are capable of following directions dictated by the pattern source to accuracies within 1 milliradian or arc.

Obviously, many modifications and variations of the present invention are possible in the light of the above teachings. It is therefore to be understood that within the scope of the appended claims the invention may be practised otherwise than as specifically described.

What is claimed:

1. A system for controllingly directing the movement of a moving object along a prescribed path, comprising: remotely located radiant energy beam-generating means for directing a beam of radiant energy toward the object and generally along a prescribed path, said beam including alternately adjacent portions of significantly different intensities, said beam having a substantially arcuate cross-section with the different intensity portions consisting of uniformly dimensioned sectors; means for nutating the beam across the object and about said path; at least two receiving means carried by said object in spaced relation to one another and responsive to the incident radiant energy beam for providing respective alternating electric signals of individual frequencies dependent upon the rate at which the portions of intensities of the beams are swept therepast, said signals having a certain frequency relation when the object is moving along the prescribed path and other frequency relations when the object is off the path; and relocating means carried by the object and responsive to the alternating signals for relocating the object in such direction as to establish the certain frequency relation and thereby the disposition of the object along the path.

2. A system according to claim 1 in which the relocating means includes first amplifying and limiting means fed by the electric signals from one of the radiant energy receiving means, a discriminator connected to the amplifying and limiting means, and a first phase resolver fed by the discriminator; and second amplifying and limiting means fed by the electric signals from the other of the radiant energy receiving means, phase shifting means associated with the outputs of the first and second amplifying and limiting means for providing a fixed phase shift of 90° therebetween, amplitude detection and filtering means connected to the phase shifting means, first circuit means interconnecting the amplitude detection and filtering means to the first phase resolver, a 90° phase shifter fed by the amplitude detection and filtering means, a second phase resolver, and second circuit means interconnecting the 90° phase shifter to the second phase resolver and the discriminator to the second phase resolver.

3. A system according to claim 1 in which the receiving means are mounted on the object in mutually spaced relation as separate assemblies, and each assembly includes as an integral part thereof a radiant energy detector and a preamplifier connected therewith.

4. A system according to claim 1 wherein the beam-generating means includes a reticle having a pattern of uniformly dimensioned arcuate sections, said sections comprising a plurality of alternately spaced first and second sectors, said first sectors having a first predetermined beam intensity transmission characteristic and said second sectors having a second predetermined beam intensity transmission characteristic, each of said first and second sectors converging at a point on the reticle.

5. A system according to claim 1 in which the relocating means includes a first limiter amplifier fed by the electric signals from one of the radiant energy receiving means, a discriminator connected to the first limiter amplifier, and a second limiter amplifier connected to the output of the discriminator providing a first control signal; a third limiter amplifier fed by electric signals from the other of the radiant energy receiving means, a first pulse generator connected to the output of the first limiter amplifier, a second pulse generator connected to the output of the third limiter amplifier, a bi-stable gate having set and reset terminals fed by the first and second pulse generators, respectively, a bandpass amplifier for receiving the output of the bi-stable gate, and phase shifting means for receiving electric signals from the bandpass amplifier and providing second and third control signals having a 90° phase difference; and gating control means actuated by the first, second and third control signals for effecting direction control and re-location of the object.

6. A system according to claim 5 in which a compensation network is electrically interposed between the discriminator and the second limiter amplifier to provide lead compensation to the object during relocating.

7. A system according to claim 5 in which the gating control means includes a plurality of AND gates fed by select combinations of the first, second and third control signals; at least two command gates electrically related to the AND gate outputs such that certain combinations of the control signals selectively place the command gates output in either of two conditions; and drive means responsive to the output condition of the command gates for driving the object toward said prescribed path.

8. A system according to claim 5 wherein the beam-generating means includes a reticle having a pattern of uniformly dimensioned arcuate sections, said sections comprising a plurality of alternately spaced first and second sectors, said first sectors having a first predetermined beam intensity transmission characteristic and said second sectors having a second predetermined beam intensity transmission characteristic, each of said first and second sectors converging at a point on the reticle.

9. A system for directing the movement of a moving object along a predetermined path, comprising: radiant energy beam-generating means for emitting a radiant energy beam in a direction generally along the predetermined path, the beam cross-section having first portions of relatively high radiation intensity levels separated by second portions of relatively low radiation intensity levels; means for nutating the beam-generating means so as to scan a region including the predetermined path and the moving object; a plurality of means carried by the object and responsive to the incident radiant energy beam for providing corresponding sets of alternating electric signals of a mutual frequency relationship definitive of the location of the moving object relative to the path; and relocating means responsive to the alternating signals for re-positioning the moving object onto the predetermined path.

10. A system according to claim 9 wherein the beam-generating means includes a reticle having a pattern of uniformly dimensioned arcuate sections, said sections comprising a plurality of alternately spaced first and second sectors, said first sectors having a first predetermined beam intensity transmission characteristic and said second sectors having a second predetermined beam intensity transmission characteristic, each of said first and second sectors converging at a point on the reticle.

References Cited
UNITED STATES PATENTS

| | | | |
|---|---|---|---|
| 2,855,521 | 10/1958 | Blackstone | 244—3.16 |
| 2,931,912 | 4/1960 | Macleish | 244—3.16 |
| 3,028,807 | 4/1962 | Burton et al. | 244—3.13 |
| 3,332,641 | 7/1967 | Bezerie | 244—3.16 |

BENJAMIN A. BORCHELT, *Primary Examiner.*

T. H. WEBB, *Assistant Examiner.*